United States Patent [19]

Hagens

[11] Patent Number: 5,242,737

[45] Date of Patent: Sep. 7, 1993

[54] SURFACE STRUCTURED FILM MADE OF THERMOPLASTIC AND A PROCESS TO MANUFACTURE SUCH

[75] Inventor: Hajo Hagens, Wiesbaden, Fed. Rep. of Germany

[73] Assignee: Hoechst Aktiengesellschaft, Frankfurt am Main, Fed. Rep. of Germany

[21] Appl. No.: 700,669

[22] Filed: May 15, 1991

[30] Foreign Application Priority Data

May 16, 1990 [DE] Fed. Rep. of Germany ....... 4015658

[51] Int. Cl.⁵ .......................... B32B 3/00; B29C 47/00
[52] U.S. Cl. ...................................... 428/156; 428/141;
428/167; 428/213; 428/220; 428/332; 428/338;
428/409; 428/910; 264/167; 264/177.1;
264/177.17; 264/177.19; 264/211.12; 264/212;
264/299; 264/319; 264/503; 264/519; 264/540;
264/556
[58] Field of Search ............... 428/409, 156, 213, 910,
428/141, 167, 220, 332, 338; 264/177.1, 177.17,
503, 519, 540, 556, 167, 177.19, 211.12, 212,
299, 369

[56] References Cited

U.S. PATENT DOCUMENTS

| | | | |
|---|---|---|---|
| 3,842,152 | 10/1974 | Witfield et al. | 264/210 |
| 3,871,947 | 3/1975 | Brekken | 161/116 |
| 4,376,147 | 3/1983 | Byrne et al. | 428/167 |
| 4,436,520 | 3/1984 | Lipko et al. | 604/385 |
| 4,677,188 | 6/1987 | Utsumi et al. | 428/480 |
| 4,794,680 | 1/1989 | Meyerhoff et al. | 29/132 |
| 4,840,836 | 6/1989 | Eyraud | 428/213 |
| 5,108,814 | 4/1992 | Harp et al. | 428/156 |
| 5,143,774 | 9/1992 | Carcio et al. | 428/169 |

FOREIGN PATENT DOCUMENTS 0260258 3/1988 European Pat. Off. .
3608286 3/1985 Fed. Rep. of Germany .

*Primary Examiner*—Donald J. Loney
*Attorney, Agent, or Firm*—G. N. Clements

[57] ABSTRACT

A biaxial stretch oriented and heat-set film made of thermoplastic is described. The film has, on at least one of its surfaces, a surface roughness ($R_a$) of greater than 0.003 µm. The surface roughness is the result of an integral texturing of the polymeric film surface. The polymer in the textured area shows essentially the same morphological state as the polymer in the interior of the film itself.

12 Claims, 4 Drawing Sheets

SURFACE STRUCTURED FILM MADE OF THERMOPLASTIC AND A PROCESS TO MANUFACTURE SUCH

BACKGROUND OF THE INVENTION

1) Field Of The Invention

The present invention relates to biaxial stretch-oriented, and heat-set film made of thermoplastic which has at least on one of its surfaces a surface roughness ($R_a$) of greater than 0.003 μm (microns). The invention also relates to a process to manufacture such a film.

2) Prior Art

It is known that very clear films made of thermoplastic show a particular undesirable tendency of blocking when wound on rolls due to their very smooth surfaces. German Patent DE-A-36 20 511 describes a solution to this problem whereby inert additives in extremely fine form are added to the thermoplastic (in this case polyester). Due to these additives, a micro roughness appears on the film surface which is responsible for an extremely thin air layer between the individual film layers of a film roll and provides for spacing between the individual film layers and, therefore, hinders blocking of the film.

In these films, the inert particles responsible for the surface features are distributed over the entire film resulting in a certain cloudiness of the film. To minimize the cloudiness, multi-layer structures are formed to improve the transparency of said polyester films, whereby the core layers are free of inert particles and only the outer layers contain inert particles having a specific order of magnitude. Said films are described in the European Patent 0 260 258.

However, it is desirable for certain usages, especially in the reprographic sector, to produce films with still further improved transparency whereby all particle addition is avoided, but where a certain sliding ability (anti-blocking) is guaranteed for handling and cutting purposes.

SUMMARY OF THE INVENTION

In the broadest sense, the present invention relates to a biaxially oriented, heat-set film having a surface roughness ($R_a$) on at least one of its surfaces greater than 0.003 microns whereby the surface roughness is the result of texturing the film surface, and the polymer in the textured area has essentially the same morphological state as the polymer in the interior of the film.

In the broadest sense, the present invention also relates to a process for producing a film by extruding a thermoplastic into a molten film, cooling the film, biaxially stretching the film, and heat-setting the film whereby at least one surface of the film is textured by an engraved roll immediately before stretching the film.

BRIEF DESCRIPTION OF THE DRAWINGS

Better understanding of the present invention may be possible by reference to the drawings in which.

DESCRIPTION OF THE PREFERRED EMBODIMENT

Figure 1:
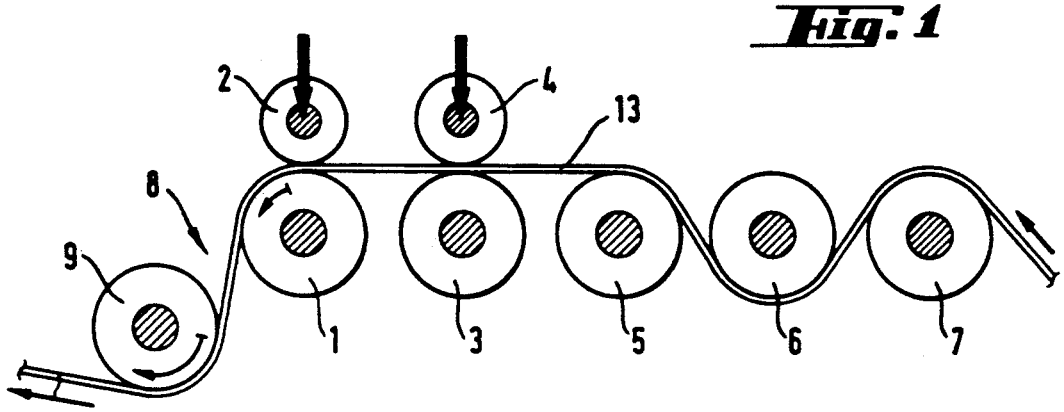
FIG. 1 shows a schematic view of preheating rolls, an engraved roll, and a contact roll.

The present invention produces a film which has, besides an excellent transparency, a sufficiently large roughness to always guarantee satisfactory handling of the film for its intended use.

The film of the present invention is characterized by a surface roughness caused by integral texturing of the film surface whereby the polymer in the area of texturing shows essentially the same morphological condition as the polymer in the interior of the film.

In principle all polymers suitable for the present invention are thermoplastic polymers capable of being oriented, and heat-set as a film. Suitable thermoplastic polymers are polyvinyl chloride, polyamide, newer polymers like polyparaphenylene sulfide or polyether ester, polyolefins like isotactic polypropylene, and preferably polyester.

This invention includes as thermoplastic polyester materials polyester homo and copolymers, mixtures of different polyesters as well as blends of polyesters with other polymers. Examples of polyester are mono or polycondensates of terephthalic acid or isophthalic acid, or 2,6-naphthalene dicarboxylic acid and glycol having 2 to 10 carbon atoms like polyethyleneterephthalate, polytetramethylene-terephthalate, polybutyleneterephthalate, poly-1,4-cyclohexylene-dimethyleneterephthalate, polyethylene-2,6-naphthalenedicarboxylate or polyethylene-p-hydroxybenzoate.

The copolyesters can contain as building blocks adipic acid, sebacic acid, phthalic acid, isophthalic acid, 5-Na-sulfoisophthalate, poly functional components like trimellitic acid and others.

The polyester mixtures can consist of, for instance, polyethyleneterephthalate and polybutyleneterephthalate, or polyethyleneterephthalate and at least one alkali metal salt of a derivative of sulfonic acid like, e.g., sulfoisophthalic acid.

Examples for polymers to be worked into or mixed with polyester are polyolefin homo or copolymers like polyethylene, polypropylene poly-4-methylpentene, ethylene-vinyl acetate copolymers which can be saponified, ionomers, polyamides, polycarbonate, polytetrafluoroethylene, polysulfones and others.

The surface roughness of the film in this invention measured according to DIN 4768 as $R_a$ ranges from 0.005 to 0.080 μm, preferably from 0.007 to 0.025 μm. According to the invention, the surface roughness is essentially formed by integral elevations rising from the film surface, made of polymer material of essentially uniform configuration. Within the present invention the term "uniform configuration" is to refer to a texture where the individual structural elements are not arranged irregularly beside each other and in purely accidental formation, but where they are similar in their fundamental geometric dimensions, form, and location on the surface, size and elevation above the film surface insofar that the impression of a certain regularity, produced by regularly recurring and similarly recognizable unit cells, appears to an unprejudiced observer. The medium diameter $d_m$ of the above mentioned unit cells in the present invention is preferably in the range of 10 to 800 μm, preferably 20 to 300 μm whereby the medium diameter is determined according to $$d_m = \frac{d_{max} + d_{min}}{2}$$

with $d_{max}$=diameter of the unit cell where it is the widest and $d_{min}$=diameter of the unit cell where it is the narrowest.

The integral surface texture in the present invention is such that it cannot be noticed by the naked human eye. This is especially the case when height h of the individual elevation measured from top to bottom is in the range of 0.001 μm<h<2.0 μm, and preferably in the range of 0.01 μm<h<0.8 μm.

The morphological state of the polymer is the result of mechanical and thermal effects on the polymer. In the present invention, the morphological state of the polymer in the film surface texture is to be the same as that of the polymer in the interior of the film. This means that the polymer of textured area is being subjected essentially to the same mechanical and thermal influences as the polymer in the interior of the film. The morphological state of the polymer is measured by means of x-ray and electromicroscopic tests.

The film of the present invention is essentially free of inert added particles and even a 200 μm thick film has a cloudiness of <3%. The feature "essentially free of inert added particles" is to be understood in this invention that no additives are to be added to the film or the plastic, but those contaminants inherent in the process or plastic manufacturing are not to be removed especially. These contaminants could be soluble or partially non soluble catalyst or stabilizer particles which are present in concentrations with a maximum value not to exceed 800 ppm, and preferably not more than 500 ppm.

The cloudiness of the film is measured in accordance with ASTM-D 1003-52 whereby a 1° slot jet is used instead of a 4° port entangling jet, and the cloudiness is measured in percent. For example, cloudiness ranges between 0.4 and 3% for a 100 μm thick PET-film manufactured according to the present invention, preferably between 0.5 and 1%.

The film shows a coefficient of friction because of its integral surface structure which is sufficient for the intended purpose of the film. The coefficient of friction ranges from 0.25 to 0.7 and especially from 0.35 to 0.55, measured according to DIN 53375 (Nov. 1986 Edition) whereby the friction behavior of the textured surface is measured against the non-textured surface.

The present invention also relates to a process to manufacture the above described film where the plastic is melted in an extruder, pressed through a jet into a molten film, cooled on a cooling drum, biaxially oriented, and heat-set at temperatures above the glass transition point. Surface texturing of the film on at least one side is done immediately before the stretch orientation of the film, by means of a laser-engraved roll which has an even surface texture. Such a laser-engraved roll is known in principle from German patent DE-A-36 08 286 or the European Patent 0 230 633. Unexpectedly, it was found that films with the above described advantageous surface texture could be obtained by using at least one such roll, preferably heated, when manufacturing the film, positioned preferably near the MD (machine direction) stretch equipment. By changing the process conditions at the MD-and/or transverse stretching (temperature, stretch ratio) and the temperature of the laser-engraved roll, the geometry and the form (intensity) of the surface texture can be adjusted precisely. Texturing is intensified by pressing the film against the hot laser-engraved roll with a contact roll.

The installation of one or several laser-engraved rolls can basically be done at different locations in the manufacturing process. For example, if a thermoplastic film is produced by the longitudinal-transverse process, the installation of the laser-engraved roll(s) presents itself in the MD stretch aggregate. Many installation combinations are possible, some of which are mentioned here:

a) In the stretch equipment illustrated in FIG. 1, draw roll 1 is a laser-engraved roll and the film 13 is pressed against draw roll 1 with contact roll 2. In this manner a one-sided textured film is obtained. In addition, pre-heating rolls 3, 5, 6, and 7 and an additional contact roll 4 are illustrated in FIG. 1. Draw roll 9 rotates at a different circumferential speed than draw roll 1, thereby creating stretch zone 8.

Figure 2:
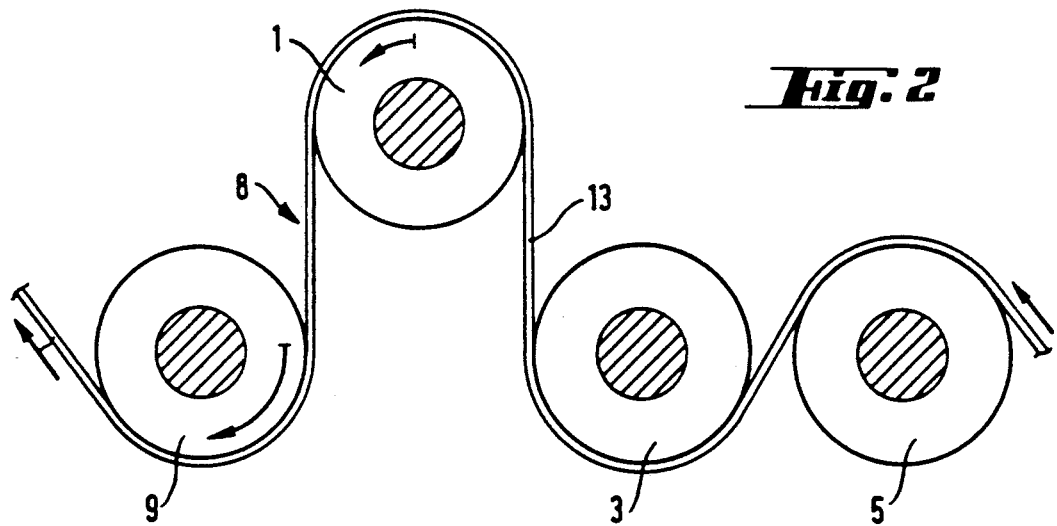
FIG. 2 shows a schematic view similar to FIG. 1 except no contact roll is shown.

It is also possible to laser-engrave an additional roll—in this case the pre-heating roll 6—in addition to the laser-engraved roll 1 illustrated in FIG. 1. In this manner a two-sided textured film can be obtained.

c) FIG. 2 shows different stretch equipment. The special feature in this illustration is that the film 13 wraps around draw roll 1 in a larger wrap angle than is shown in FIG. 1, so that a contact roll is not necessary. If one-sided texturing of the film is planned, either pre-heated roll 3 or draw roll 1 can be laser-engraved. If the film is to be textured on both sides, both rolls 1 and 3 must be laser-engraved. In FIG. 2, a stretch zone 8 is formed between draw rolls 1 and 9. Additional, roll 9 may also serve as a cooling roll.

In the following Example the present invention is explained in more detail by micro photographs of the film.

EXAMPLE 1

A polyethyleneterephthalate melt, comprising only particles of catalysts and stabilizers but no additional inert particles, and having an intrinsic viscosity of 0.65 dl/g (deciliters/gram) was extruded on a casting drum as an amorphous film. Next, this film was longitudinally stretched to 2.2 times its size between rolls running at different speeds at about 95° C. The draw aggregate employed is shown in FIG. 1. Longitudinal stretching was followed by transverse stretching to a factor of 3.8 times its size at 95° C. Next the biaxial stretched film was heat-set at 205° C. The final film thickness was about 40 μm.

In FIG. 1, roll 1 represents the draw roll where the film was wrapped around a portion of the roll, and then stretched in transverse direction. The draw roll temperature was 103° C.

The roll was coated with chromium oxide—$Cr_2O_3$. The roll surface was treated with a laser in such a way that about 450 equally large melt cells were formed per square millimeter of oxide coating. The pre-heated, unoriented film was pressed against the draw roll with a contact roll 2.

Figure 3:
FIG. 3 is a differential-interference-contrast microscope photograph of the surface of a textured film of the present invention.

FIG. 3 shows the differential-interference-contract-microscope-photo (DIC) of the textured film surface 100 times enlarged. The regularly recurring "unit cells"

can be clearly recognized. The features of the film processed according to this Example are shown in the Table.

EXAMPLE 2

Compared to Example 1 only the transverse stretching factor was varied, it was raised to 3.2. The final film thickness was again 40 μm. The resulting film features are summarized in the Table.

Comparative Example 1

Example 1 was repeated but with the difference that the draw roll coated with chromium oxide was not laser-engraved. The features of the film processed according to this Example are found in the Table.

Figure 4:
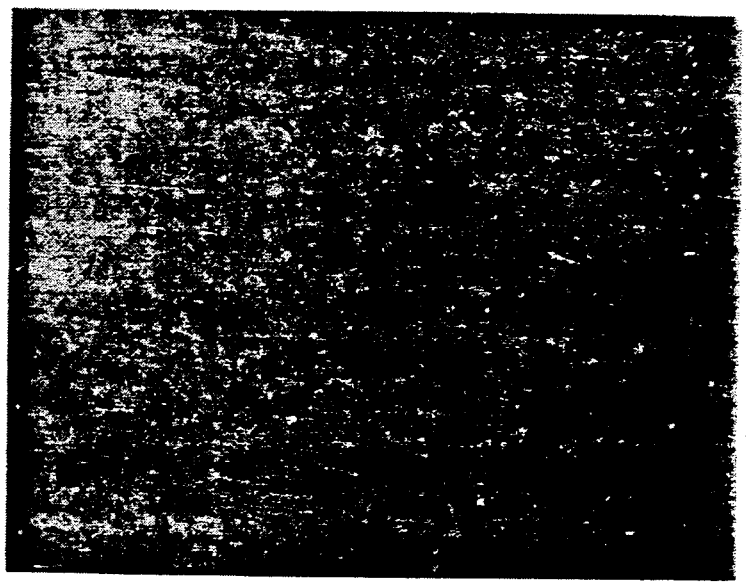
FIG. 4 is a differential-interference-contrast microscope photograph of the surface of a commercially available film.

FIG. 4 shows the DIC-photo of the surface of a film processed according to this Example; except for tiny bumps (due to inherent particles in the process), no texture is seen on the film surface.

Comparative Example 2

As a modification in the equipment of Example 1 contract roll 2 was dropped. The resulting film features are summarized in the Table.

Figure 5:
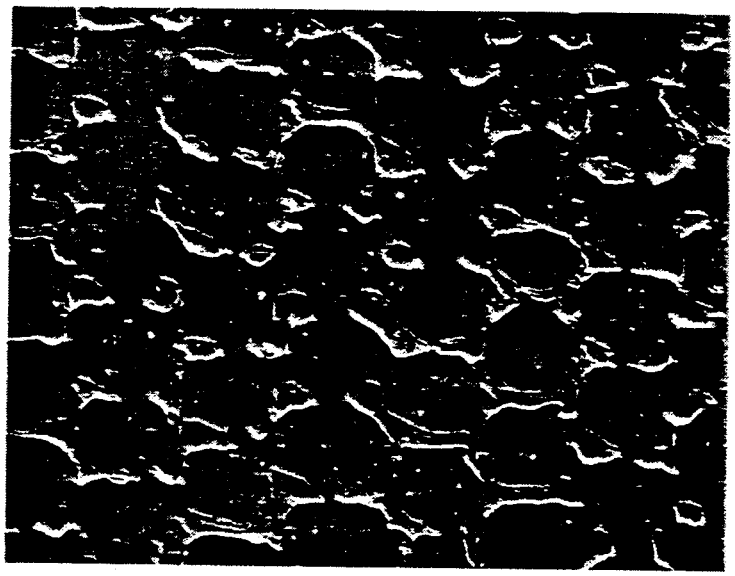
FIG. 5 is a differential-interference-contrast microscope photograph of the surface of another commercially available film with non-uniform texturing.

FIG. 5 shows the DIC-photo of the film processed according to this comparative example, enlarged 100 times. In comparison to FIG. 3 less distinct and especially less even texturing of the film surface is seen.

TABLE

|  | Draw Roll Laser Engraved | Contact Roll On Draw Roll | MD factor | Slipping Friction Coefficient | Cloudiness (%) | $R_a$ 1) |
|---|---|---|---|---|---|---|
| Example 1 | yes | yes | 2.2 | 0.35–0.45 | 0.6–0.7 | 12 |
| Example 2 | yes | yes | 3.2 | 0.40–0.60 | 0.6–0.7 | 10 |
| Comparative Example 1 | no | yes | 2.2 | total blocking | 0.5 | 4 |
| Comparative Example 2 | yes | no | 2.2 | highly fluctuating 0.4–1.0 | 0.5–0.7 | highly 8–12 |

1) The roughness characteristic value $R_a$ was determined according to DIN 4768 with equipment by Hommelwerke GmbH, D-7730 Villingen-Schwenningen (Electronic unit: Type T20S/Taster: Type TKE100-2864)

As apparent from Comparative Example 1 and the Table, the film is not textured when using a non laser-engraved draw roll. Therefore the film has a relative low roughness value and an inadequate slipping behavior (blocking).

Comparative Example 2 shows that the film wrapped as shown in FIG. 1 without using a contact roll which presses the film against the laser-engraved roll is not evenly textured. This leads to highly fluctuating slipping friction values and roughness values and blocking of two film layers occurs.

What is claimed is:

1. A film comprising: a biaxial stretch oriented and heat-set film made of thermoplastic having a surface roughness ($R_a$) from 0.003 μm to 0.080 μm on at least one of its surfaces wherein the surface roughness is a result of an integral texturing of the film surface, whereby said film in the textured area has essentially the same morphological state as the interior of said film.

2. Film as set forth in claim 1, wherein said thermoplastic is polyethyleneterephthalate.

3. Film as set forth in claim 1, wherein said surface roughness ranges from 0.005 to 0.080 μm.

4. Film as set forth in claim 1, wherein said textured area has integral elevations rising from said surface consisting of thermoplastic of even configuration, and wherein height h of said integral elevations measured from top to bottom is in the range of $0.001 \mu m < h < 2.0 \mu m$.

5. Film as set forth in claim 4, wherein said integral elevations rising from the film surface are recurring unit cells.

6. Film as set forth in claim 5, wherein the medium diameter $d_m$ of said unit cell ranges from 10 to 800 μm.

7. Film as set forth in claim 1, wherein said film is a 100 μm thick film and has a cloudiness between 0.4 and 3%.

8. Film as set forth in claim 1, wherein the coefficient of friction of said film ranges from 0.25 to 0.7.

9. A process to produce a film, comprising: extruding a thermoplastic into a molten film, cooling said film on a cooling drum biaxially orienting said film; and heat-setting said film at a temperature above the glass transition temperature of said thermoplastic; further comprising heating said film above the glass transition temperature immediately before biaxially orienting said film; and texturing at least one surface of said film.

10. The process according to claim 9, wherein said texturing is by means of an engraved roll suitably contacting said film.

11. The process as set forth in claim 10, wherein said engraved roll is heated.

12. The process as set forth in claim 11 further comprising the step of processing said film against said heated engraved roll with a contact roll.

* * * * *